United States Patent [19]
Benninger et al.

[11] 3,891,625
[45] June 24, 1975

[54] TERTIARY PERFLUORO-AMINO ETHERS

[75] Inventors: Siegfried Benninger, Schwalbach, Taunus; Siegfried Rebsdat, Neuotting, both of Germany

[73] Assignee: Hoechst Aktiengesellschaft, Frankfurt am Main, Germany

[22] Filed: Aug. 9, 1973

[21] Appl. No.: 386,856

[52] U.S. Cl. ............... 260/239 A; 204/62; 252/67; 260/248 NS; 260/268 R; 260/268 SY; 260/293.9; 260/309.7; 260/326.5 R; 260/584 R; 260/584 B
[51] Int. Cl. .......................................... C07d 51/70
[58] Field of Search .... 260/248 NS, 268 R, 268 SY, 260/293.9, 309.7, 583 GG, 584 B, 584 R, 260/239 A, 326.5 R

[56] References Cited
UNITED STATES PATENTS

| | | |
|---|---|---|
| 2,519,983 | 8/1950 | Simons .................................. 204/62 |
| 3,535,381 | 10/1970 | Hauptschein et al. ............ 260/570.9 |
| 3,564,059 | 2/1971 | Sianesi et al. ........................ 260/594 |
| 3,642,705 | 2/1972 | Zollinger ...................... 260/77.5 AP |
| 3,717,679 | 2/1973 | Thompson et al. ......... 260/567.6 M |
| 3,766,251 | 10/1973 | Caporiccio et al. ......... 260/486 H |

*Primary Examiner*—G. Thomas Todd
*Attorney, Agent, or Firm*—Curtis, Morris & Safford

[57] ABSTRACT

Perfluorinated linear or cyclic oligoamines having ether groups, useful as inert reaction media or as hydraulic liquids, prepared by the electrofluorination, in anhydrous HF, of the addition products formed between hexafluoropropene or tetrafluoroethylene and linear or cyclic oligoamines having nitrogen atoms substituted by oxyalkyl groups.

24 Claims, No Drawings

TERTIARY PERFLUORO-AMINO ETHERS

The present invention relates to tertiary perfluoro-amino ethers and a process for their preparation.

It is known that perfluoro-alkanes, perfluoro-ethers and perfluoro-trialkylamines, because of their excellent chemical resistance, are especially suitable for such applications in nuclear and chemical technology which involve subjection to the action of aggressive chemicals, for example contact with fluorine or other fluorine-active substances, other halides, pure oxygen, strong acids, bases, oxidants or reducing agents. Furthermore, these perfluorinated derivatives are used in the electric industry as heat transfer media, cooling liquids or dielectrics. In this connection, low vapor pressure and a simultaneous low tendency to crystallize often are especially interesting properties of these inert liquids. Since perfluoro-n-alkanes having chain lengths of more than 10 carbon atoms are already solid at room temperature, and since tertiary perfluoro-alkylamines having from 15 to 17 carbon atoms can be prepared with yields of less than 15 % only, applications requiring scarcely volatile inert liquids are a field where above all perfluoro-polyether fluids are used (cf. U.S. Pat. Nos. 3,214,478 and 3,555,100). Numerous disadvantages, for example difficult preparation, wide range of molecular weight distribution in the products and, thus, the presence of undesired by-products, and an expensive stabilization of the terminal

groups, were reasons for the search for other perfluorinated inert liquids of easier preparation and a variable range of the number of carbon atoms, and thus volatility, as wide as possible.

The present invention provides a new class of multi functional tertiary perfluoro-amino ethers corresponding to the formulae I$a$ and I$b$

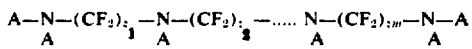

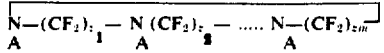

In these formulae, the subscript $m$ (of $z_m$) indicates the number of structure units

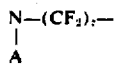

being present in one molecule. The subscripts $z_1, z_2, ..... z_m$ may be the same or different and indicate each the number of $CF_2$ groups situated between two nitrogen atoms. There should be no more than three different subscripts $z$ in one molecule. A represents a

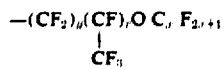

group. The subscripts $m, x, y, v$ and $z$ each represent positive integers having the following meanings:

1. Formula I$a$: $1 \leq m \leq 7$ ; $2 \leq z \leq 6$ ; $x$ is 2 or 3; $v$ is 0 or 1; when $v$ is 0, $y$ is 2 or 3; when $v$ is 1, $y$ is 1. In addition, $z_1 + z_2 + -..... z_m = \Sigma z \leq 15$. The number of $CF_2$ groups between the two outer nitrogen atoms of formula I$a$ therefore should not be greater than 15. The value $m + 1$ indicates the number of nitrogen atoms in one molecule.

2. Formula I$b$: $1 \leq m \leq 4$ ; $1 \leq z \leq 5$ ; $x$ is 2 or 3, $v$ is 0 or 1; when $v$ is 0, $y$ is from 1 to 3 ; when $v$ is 1, $y$ is 1. In addition, $3 \leq z_1 + z_2 + ..... z_m = \Sigma z \leq 5$. The ring in formula I$b$ therefore contains less than six, but more than two $CF_2$ groups. The subscript $m$ indicates simultaneously the number of nitrogen atoms in one molecule.

The substances of the present invention are tertiary, aliphatic oligo-perfluoro-amino ethers which, contrary to the hitherto known perfluoro-polyethers or multifunctional tertiary amines, are characterized by ether groups of the following structures:—$CF_2OC_2F_5$, —$CF_2OC_3F_7$, $CF_2CF_2OC_2F_5$, $CF_2CF_2OC_3F_7$, $CF_2CF_2CF_2OC_2F_5$, $CF_2CF_2CF_2OC_3F_7$, —$CF_2CF(CF_3)OC_2F_5$ and — $CF_2CF(CF_3)OC_3F_7$ linked to N.

It has been found that the substances of this invention are very suitable as evaporation and convection cooling agent, turbine propellant, or lubricants the important physical data, for example vapor pressure or solidification temperature, may be adapted to the requirements of the desired application by a corresponding choice of the parameters.

Besides chemical inertness, an extraordinarily wide fluidity range of the compounds, that is, an extraordinarily wide range between the solidification and boiling points, is an especially interesting property of the new perfluorinated substances, which means an extension of their application possibilities to refrigeration technology.

A further application for the high molecular weight members of this new class of substances is their use as hydraulic liquids.

When using the products of the invention as inert reaction media for fluorination reactions with highly reactive fluorine transmitters or with $F_2$, it is advantageous to be able to choose the volatility of the medium in accordance with the reaction conditions.

Because of their high $O_2$ solubility values, the easily volatile compounds of this new class of substances, especially those of formula I$b$, are also very suitable as blood substitute liquids. (cf. German Offenlegungsschrift No. 2,144,094).

The present invention furthermore provides those mixtures of compounds of formula I$a$ or I$b$ which are obtained in the electrofluorination of a compound of formula IV$a$ or IV$b$ (described further below). These mixtures are formed because in the fluorination, C—C, C—O and C—N bonds may be split at different places in the molecule, resulting in a shortening of the chain. The individual radicals A linked to N may be differently shortened, so that a starting compound may yield a spectrum of perfluoro compounds of the formula I$a$ or I$b$. For example, the radicals —$OC_3F_7$ or —$OC_2F_5$ may be shortened to —$OCF_3$ or split off completely and replaced by fluorine. Thus, compounds of formula I$a$ or I$b$ are formed in which the subscript $x$ in the A group may also be 1. After the electrofluorination of

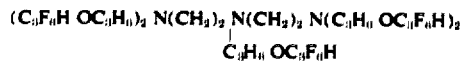

for example, a small amount of the compound $$C_2F_5O(CF_2)_3-N-(CF_2)_2-N-(CF_2)_2-N-(CF_2)_3OCF_5$$
$$\hspace{2cm} | \hspace{2cm} / \hspace{2cm} |$$
$$\hspace{1.5cm} C_3F_7 \hspace{1cm} (CF_2)_3OC_3F_7 \hspace{1cm} C_3F_7$$

may be isolated, in which only the radical A situated at the central nitrogen atom is not shortened.

The formation of fission products is characteristic of the Simons process, as well as for all other direct fluorination processes which uses $F_2$, $CoF_3$ and similar substances, and it is a result of the extreme heat of formation of the fluorination product. On the other hand, the specific advantage of the process in accordance with the present invention as compared to hitherto known fluorination processes is the high yield of utilizable products. The low decomposition and degradation rates of this process for the first time permitted the preparation of, especially, the high molecular weight compounds of formula I$a$. On the whole, the process thus results in an important extension of the application field of the electric fluorination according to Simons, since hitherto no process was known which would have permitted the preparation of perfluorinated substances being scarcely volatile to such an extent; on the contrary, in view of product yield, the application of the Simons process was practically limited to compounds having a maximum of 12 to 15 carbon atoms.

As mentioned before, short-chain by-products are necessarily present in admixture with the desired substances, but this does not at all restrict their application possibilities; on the contrary, it may even serve for an extension of the application field. Moreover, any fractions whatsoever may be separated by fractional distillation; the possibility of distilling, at normal pressure, even compounds having a molecular weight above 1,000, simultaneously demonstrating the high thermal stability of the class of substances in accordance with this invention.

The present invention therefore provides also a process for the preparation of compounds of formula I$a$ or I$b$ which comprises A. introducing in known manner oxyethyl or oxypropyl groups into an oligomeric amine of formula II$a$ $$H-N(CH_2)_z - N(CH_2)_z - N(CH_2)_z \ldots N(CH_2)z_m - NH_2$$
$$\hspace{0.5cm} H \hspace{0.5cm} 1 \hspace{0.5cm} H \hspace{0.5cm} 2 \hspace{0.5cm} H \hspace{0.5cm} 3 \hspace{0.5cm} H$$
$$\hspace{8cm} IIa$$

(e.g. by reaction with ethylene oxide, propylene oxide or 3-chloro-propanol-1), and B. completely etherifying the obtained compounds of formula III$a$ $$E-N(CH_2)_z - N(CH_2)_z - N(CH_2)_z \ldots N(CH_2)z_m - NE_2$$
$$\hspace{0.5cm} E \hspace{0.5cm} 1 \hspace{0.5cm} E \hspace{0.5cm} 2 \hspace{0.5cm} E \hspace{0.5cm} 3 \hspace{0.5cm} E$$
$$\hspace{8cm} IIIa$$

where E is the $$-(CH_2)_u-(CH)_v-OH$$
$$\hspace{1cm} |$$
$$\hspace{0.5cm} CH_3$$

group, with tetrafluorethylene in known manner or with hexafluoropropylene in the presence of a trialkylamine as catalyst in an aprotic solvent to form compounds of the formula IV$a$ $$B-N(CH_2)_z - N(CH_2)_z - N(CH_2)_z \ldots N(CH_2)z_m - NB_2$$
$$\hspace{0.5cm} B \hspace{0.5cm} 1 \hspace{0.5cm} B \hspace{0.5cm} 2 \hspace{0.5cm} B \hspace{0.5cm} 3 \hspace{0.5cm} B$$

where B is the $$-(CH_2)_u-(CH)_v-O-C_xF_{2x}H$$
$$\hspace{2cm} |$$
$$\hspace{1.5cm} CH_3$$

group, and

C. subjecting the compounds IV$a$, dissolved in anhydrous hydrofluoric acid, to electrolysis.

The subscripts $m$, $x$, $v$, $y$ and $z$ of the cited formulae are as defined in formulae I$a$ and I$b$.

In the same manner, also cyclic perfluoro-amino ethers may be prepared by

A. introducing in known manner oxymethyl, oxyethyl or oxypropyl groups into a cyclic amine of formula II$b$ $$\overline{N-(CH_2)_z - N(CH_2)_z - N(CH_2)_z \ldots N(CH_2)z_m}$$
$$\hspace{0.3cm} H \hspace{0.5cm} 1 \hspace{0.5cm} H \hspace{0.5cm} 2 \hspace{0.5cm} H \hspace{0.5cm} 3 \hspace{0.5cm} H$$
$$\hspace{8cm} IIb$$

(e.g. by reaction with formaldehyde, ethylene oxide, 3-chloropropanol-1 or propylene oxide), B. reacting the obtained compounds of formula III$b$ $$\overline{N-(CH_2)_z - N(CH_2)_z - N(CH_2)_z \ldots N(CH_2)z_m}$$
$$\hspace{0.3cm} E \hspace{0.5cm} 1 \hspace{0.5cm} E \hspace{0.5cm} 2 \hspace{0.5cm} E \hspace{0.5cm} 3 \hspace{0.5cm} E$$
$$\hspace{8cm} IIIb$$

where E is again the $$-(CH_2)_u-(CH)_v-OH$$
$$\hspace{1cm} |$$
$$\hspace{0.5cm} CH_3$$

group, with tetra-fluorethylene in known manner or with hexafluoropropylene in the presence of a trialkylamine as catalyst in an aprotic solvent to form the completely etherified compounds of formula IV$b$ $$\overline{N-(CH_2)_z - N(CH_2)_z - N(CH_2)_z \ldots N(CH_2)z_m}$$
$$\hspace{0.3cm} B \hspace{0.5cm} 1 \hspace{0.5cm} B \hspace{0.5cm} 2 \hspace{0.5cm} B \hspace{0.5cm} 3 \hspace{0.5cm} B$$
$$\hspace{8cm} IVb$$

and

C. subjecting the compounds of formula IV$b$, dissolved in anhydrous hydrofluoric acid, to electrolysis.

The subscripts $m$, $x$, $v$, $y$ and $z$ are as defined in formulae I$a$ and I$b$; the radical B is as defined in formula IV$a$.

For attaining high yields in the electrofluorination, it is of utmost importance that all hydrogen atoms directly linked to a nitrogen atom are converted. Therefore, it may be advantageous especially in the case of an oxyethylation to introduce an amount slightly above the stoichiometric $C_2H_4O$ amount. This involves the presence of $-N-C_2H_4$ O $C_2H_4$ OH groups besides $-N$ $C_2H_4$ OH groups in the compounds of formula III in certain cases, which causes the process of the invention to yield products part of which have perfluoro-diether side chains, for example $-N-(CF_2)_2$ O $(CF_2)_2$ $OC_2F_5$ or $-N(CF_2)$ O $)_2$ $2)_2$ O $C_3F_7$ Thus, the following amino ethers, cited as examples, may be prepared (the crude yields, after discharge from the cell, being in part above 50 %; the yields after work-up being in part about 40 % of the theoretical yield or even higher):

1) compounds of formula Ia:

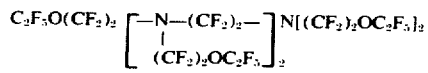
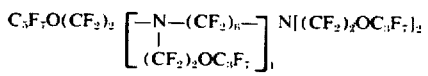
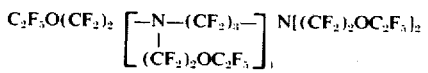
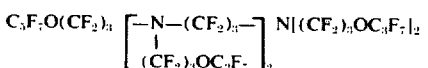
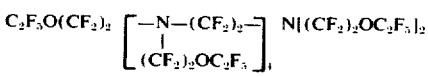
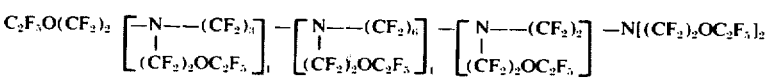
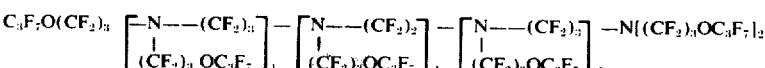
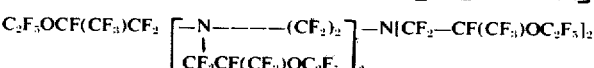
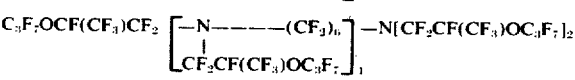

2) compounds of formula Ib

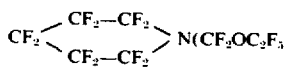
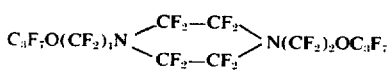
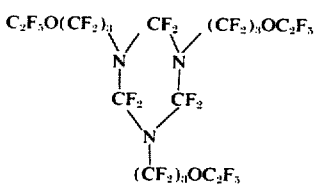
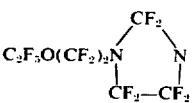
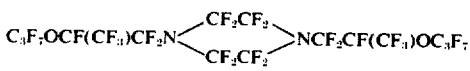

Because of their especially easy preparation, compounds of the formulae Ia and Ib in which $v$ is 0 and $y$ is 2, are especially interesting.

The present invention provides furthermore the preliminary products of the compounds of formulae Ia and Ib, corresponding to the formulae IVa and IVb, which are defined as follows: The subscript $m$ (of $z_m$) indicates the number of

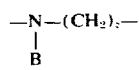

structural units present in one molecule. The subscripts $z_1, z_2, \ldots z_m$ may be the same or different and indicate each the number of $CH_2$ groups situated between two nitrogen atoms. Three different subscripts $z$ at a maximum should only be present in one molecule. B represents the

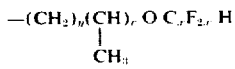

group.

The subscripts $m$, $x$, $y$, $v$ and $z$ are positive integers having the following meanings:

1. Formula IVa: $1 \leq m \leq 7$; $2 \leq z \leq 6$; $x$ is 2 or 3, $v$ is 0 or 1; when $v$ is 0, $y$ is 2 or 3; when $v$ is 1, $y$ is 1. In addition, $z_1 + z_2 + \ldots z_m = \Sigma z \leq 15$. The number of $CH_2$ groups between the two outer nitrogen atoms of fromula IVa therefore should not be greater than 15. The $m + 1$ value indicates the number of nitrogen atoms in one molecule.

2. Formula IVb: $1 \leq m \leq 4$; $1 \leq z \leq 5$; $x$ is 2 or 3, $v$ is 0 or 1; when $v$ is 0, $y$ is from 1 to 3; when $v$ is 1, $y$ is 1. In addition, $3 \leq z_1 + z_2 + \ldots z_m = \Sigma z \leq 5$. The ring in formula IVb therefore contains less than six, but more than two $CH_2$ groups. The subscript $m$ indicates simultaneously the number of nitrogen atoms in one molecule.

The preliminary products of formulae IVa and IVb may be prepared as follows:

The corresponding amino alcohol of formula IIIa or IIIb is dissolved in an aprotic polar solvent, for example acetonitrile or dimethyl formamide, and from 0.25 to 0.50 mole of triethylamine are added per mole of hydroxyl groups to be converted. At a temperature of from −30° to + 100°C, preferably from 0° to 40°C, hexafluoropropene is introduced, the establishment of pressure not being necessary. The product obtained is thoroughly washed with water, dried and freed from triethylamine residues under highly reduced pressure. The remaining low molecular weight hexafluoropropyl ethers may be vacuum distilled. The low volatility compounds, however, which would be partially decomposed in such an operation, are purified by column chromatography, preferably using neutral silica gel as the stationary phase and a 1:1 acetic acid ester/petroleum ether mixture as the mobile phase. Hexafluoropropyl ethers of the formula IVa or IVb are obtained in which $x$ is 3.

The corresponding tetrafluoro-ethyl ethers ($x$ being 2) may be prepared in analogous manner according to known methods. After addition of metallic sodium as catalyst for the dissolution of the amino alcohol of formula IIIa or IIIb in dimethyl formamide or another aprotic polar solvent, tetrafluoroethylene is introduced at 15° to 60°C under slightly elevated pressure (about 1 to 5 atm/gauge). The work-up is the same as in the case of the hexafluoropropyl ethers. Because of their sensitivity to high temperatures, the tetrafluoro-ethyl ethers are not purified by distillation.

These preliminary products for the preparation of compounds of formulae Ia and Ib are water-insoluble liquids of a relatively high viscosity which, because of their thermal sensitivity, are not purified by distillation after the preparation step B, but only washed and dried. Very advantageous for the electrolysis is their high degree of solubility in hydrofluoric acid and the good electric conductivity of these hydrofluoric acid solutions. The advantage resides in the fact that for the first time the electrofluorination of a series of scarcely volatile perfluorinated inert compounds having up to about 40 carbon atoms has become possible, and that furthermore a considerable increase of yields as compared to hitherto known processes can be attained in the range of a low carbon atom content of down to seven carbon atoms. A surprise is the insignificant formation of secondary polymeric substances, which formation, in the case of the most hitherto known Simons processes, requires more or less frequent interruptions of the electrolysis, since the anodes become covered with a polymer film and thus are blocked; in most cases, the anodes can be reused only after a mechanical and chemical cleaning. These trobules hitherto were a serious handicap for a continuous electrolysis, since they resulted in production losses, increased wear of nickel, poor yields and additional electrolyte distillation in order to remove the tarry substances. During the preparation of the compounds Ia and Ib of the invention, however, the electrodes remain operational for a practically unlimited time, and there is only insignificant formation of tarry products, as was proved by work-up of completely exhausted electrolytes.

The electric fluorination of compounds of formula IVa or IVb was carried out in a Simons cell of usual design (cf. U.S. Pat. No. 2,519,983) with only small modifications. The cell consisted of a vessel made from stainless steel provided with a cooling jacket for brine cooling. The cell bottom had a cylinder-like cavity provided with outlet valve at the deepest point in order to collect the precipitated perfluorinated substances formed and the insignificant amounts of nickel fluoride falling down from the anodes.

The electrolyte circulated was fed in in the upper fourth of this precipitation cylinder at a small angle directed to the top; thus, the perfluorinated product were not subjected to a steady action of fluorine at the electrodes, and simultaneously a concentration of nickel fluoride or anode mud between the electrodes were excluded.

The cell had a capacity of 1.8 liters and contained a package of 19 parallel nickel plates the distance between which was 3.0 mm and which had an anode area of 26.1 dm². The electrolyte was passed through the cell from bottom to top by means of a circulation pump of high output and was again forwarded to the suction face of the pump via an exhaust gas device. The cell was furthermore provided with a steel reflux condenser, a liquid level indicator and a scrubbing tower for the after-purification of the hydrogen. The electrolysis proceeded always for several days at a voltage of from 4 to 7.5 volts, a current density of from 0.5 to 3.5 A/dm², and an electrolyte temperature of from −20° to + 30°C, preferably from 0° to 15°C. The concentration of the starting materials IVa or IVb in hydrofluoric acid was from 5 to 25, preferably from 5 to 15 weight %; this concentration was maintained almost constant by discontinuous after-dosage of material in short intervals. Also hydrofluoric acid was added when necessary in order to maintain the liquid level in the cell.

When the electrolysis was carried out at a scale which was larger by a factor of 20 and for longer electrolysis times, the yields were considerably higher, partially by even a half, than the laboratory yields.

Because of a prolonged induction period at the start of the electrolysis, the formation of product was delayed, which adversely affected the current efficiency, the more so the shorter the total electrolysis time. It is therefore advantageous to carry out the electrolysis continuously.

The fluorination products, which could be easily separated because of their insolubility in hydrofluoric acid, were purified by several hours' boiling in an aqueous 10 to 20 % alkaline lye. Subsequent washing, drying and fractional distillation yielded the perfluorinated inert liquids.

The analysis of the products was carried out by gas chromatography using a column containing a packing of silicone rubber SE 30 on chromoscorb WAW DMSC. The percentages in the examples represent the area amounts of the individual components, relative to the total area.

For a further characterization, the mass spectra of the individual main components were taken by means of a mass spectrometer connected to the gas chromatograph. In the case of the low volatility compounds having up to about 20 carbon atoms, the main components were also insolated by means of preparative gas chromatography and examined by NMR spectroscopy,

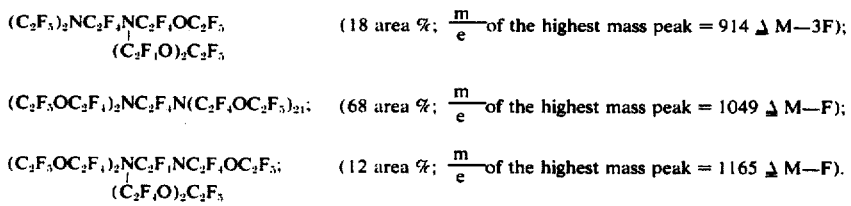

which always confirmed the structure resulting from mass spectroscopy.

The following examples illustrate the invention.

EXAMPLE 1

A Simons cells of the kind as described above was charged with 1,600 g of anhydrous hydrofluoric acid and 200 g of a partially fluorinated amono ether of the following structure:

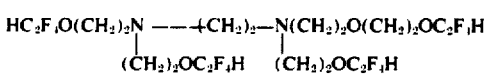

Within 78 hours, 715 g of this compound were added in small portions of about 20 to 50 g. At an electrolysis temperature of + 5°C, a voltage of from 4.9 to 6.5 volts and an average current density of 1.2 A/dm², a total of 462 g of perfluorinated crude product was obtained with corresponds to 28.8 % of the theoretical yield, relative to the following reaction equation:

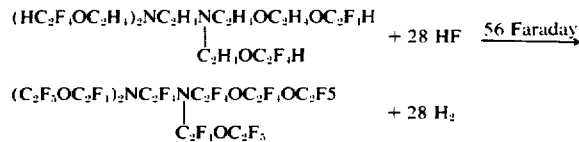

After the test had been finished, 47 g of starting material were obtained by work-up of the electrolyte, which increased the crude yield to 30.2 %. THe fluorination product, after two hours' boiling with 50 % KOH solution, was washed with water, dried and then fractionated. The first fraction 1 passing over at from 101° to 140.5°C/752 mm Hg (stem corrected) contained 64 area % of a component having a $CF_3N(CF_2CF_2OC_2F_5)_2$ structure, as was proved by the mass spectrum ($m/e$ of the highest mass peak = 534 $\triangle$ M—F) and the NMR spectrum. The following fraction 2 was collected in vacuo at 2 mm Hg, it passed over at from 35° to 49°C and contained the following components:

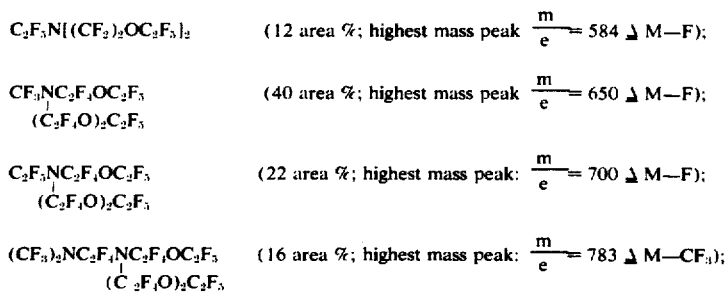

The even less volatile components passed over in the third fraction 3 (up to 76°C/0.4 torr), which contained substantially the following substances:

The structures were confirmed by NMR spectra. The weight distribution of the fractions was the following:
49 % fraction 1
19 % fraction 2
32 % fraction 3

The solidification points of the 3 fractions were the following:
fraction 1: — 115°
fraction 2: — 106°
fraction 3: — 76°

EXAMPLE 2

In analogy to Example 1, 230 g of tetrakis-N,N,N',N'-(2-H-tetra-fluoro-ethoxyethyl)-hexamethylene diamine and 1,600 g of anhydrous hydrofluoric acid were electrolyzed within 77 hours at + 5°C and a voltage of from 4.4 to 6.2 volts. A total of 178 g of fluorination product, corresponding to 42.2 % of the theoretical yield, relative to the following reaction equation, was obtained.

$(HC_2F_4OC_2H_4)_2N(CH_2)_6N(C_2H_4OC_2F_4H)_2 + 32 \text{ HF}$
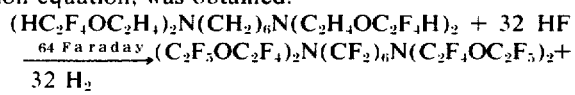
$32 H_2$ By means of the usual purification operations, a further 129 g of pure perfluorinated product were obtained from the crude product contaminated by nickel fluoride. About 12 % thereof passed over at 132°–184°C (mainly consisting of component 1), about 33 % at 182°–285°C (mainly consisting of components 2 to 4) and about 55 % at 90°–142°C/0.4 torr (mainly consisting of components 5 to 8).

A combination of gas chromatography and mass spectrometry, the following structures of the following main components were determined:

1. $CF_3(CF_2)_4 N(CF_2CF_2OCF_2 CF_3)_2$; highest mass peak at $m/e = 734$ (corresponding to M—F) and about 12 % of the area in the gas chromatogram of the non-fractionated original mixture.

2. 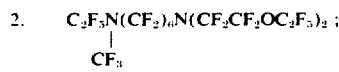

$m/e = 967$ ($\underline{M}$-F) as highest mass peak and further intense peaks at $m/e = 879$ and 829. In the gas chromatogram, the substance showed as a peak taking 4 area %.

3. 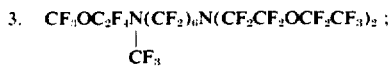

highest mass peak at $m/e = 1,033$ ($\underline{\Delta}$ M—F) and further intense peaks at $m/e = 945$ ($\underline{\Delta}$ M — $CF_3$ — F) and 917 ($\underline{\Delta}$ M — $CF_2$ $OCF_3$).

4. 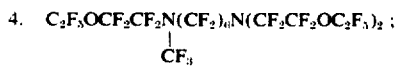

highest peaks at $m/e = 1,083$ ($\underline{\Delta}$ M—F) and 1,045 ($\underline{\Delta}$ M—3 F).

5. 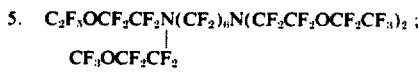

highest peaks at $m/e = 1,180$ ($\underline{\Delta}$ M—2 F) and 1,161 (M—3 F)

6. $(CF_3CF_2OCF_2 CF_2)_2N(CF_2)_6N(CF_2CF_2OCF_2CF_3)_2$ highest peaks at $m/e = 1,230$ ($\underline{\Delta}$ M—2 F) and 1,180 ($\underline{\Delta}$ M—$CF_3$—F).

7. 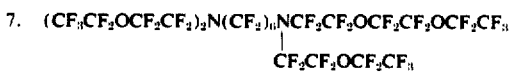

highest peaks at $m/e = 1,365$ ($\underline{\Delta}$ M – F) and 1,346 (M—2F).

8. 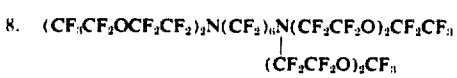

highest mass peaks at $m/e = 1,450$ (M⁺) and 1,315 (M—$OC_2F_3$)

The latter four substances together take 49 % of the gas chromatogram area of the non-fractionated original mixture and about 72 % of the fraction having the highest boiling point. With respect to the structures of components 7 and 8 it has to be taken into consideration that the ethoxylation was carried out with a small excess.

EXAMPLE 3 a. Tetrakis-N,N,N', N'-(2-H-hexafluoro-propyloxyethyl)-hexamethylene diamine 300 g of tetrakis-N,N,N'.N'-(β-oxyethyl)-hexamethylene diamine having a degree of purity of 90 % were dissolved in 1 l of acetonitrile, and 300 g of triethylamine were added. A total of 800 g of hexa-fluoropropylene was introduced within 3 to 4 hours at 5° to 10°C, after which operation free hydroxy groups could no longer be detected by infrared spectroscopy. For workup, the solution was washed with icewater, dried over $Na_2SO_4$ and freed from amine residues under highly reduced pressure. Yield: 740 g of product (83 % of the theoretical yield).

b. Perfluoro-N,N,N',N'-(propyloxyethyl)-hexamethylene diamine 433 g of tetrakis-N,N,N',N'-(2-H-hexafluoropropyloxy-ethyl)-hexa-methylene diamine were fluorinated within 59 hours in the cell as described before at a voltage from 4.7 to 6.0 volts and an average electrolysis temperature of 5°C. 145 g of fluorination product precipitated. As resulted from the work-up of the electrolyte, it was not completely converted; after having distilled off the hydrofluoric acid, a 160 g residue remained having a molecular weight of 1,058 (osmometrically determined) and the following analysis data: 30.4 % C; 2.1 % H; 57.5 % F, which corresponds to about the compound $C_{26}H_{21}F_{35}N_2O_4$, that is, an already partially fluorinated compound having 11 fluorine atoms more than the starting product.

It can be supposed that, in case of a complete fluorination, the yield of 20.4 % of the theoretical yield (relative to the following reaction equation) would be higher by one third.

$(HC_3F_6OC_2H_4)_2N(CH_2)_6N(C_2H_4OC_3F_6H)_2 + 32 \text{ HF}$
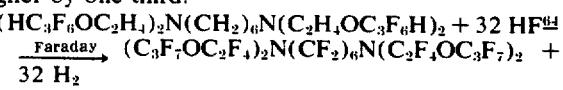
$32 H_2$ The crude product worked up in usual manner yielded 94.7 g of distillate after a vacuum distillation, which distillate passed over at from 55° to 211°C/ <1 mm Hg.

The gas chromatography analysis and the mass spectrometric examination gave the following results:

1. $CF_3(CF_2)_2N(CF_2CF_2OCF_2CF_2CF_3)_2$; $m/e$ of the highest mass peak = 696 (corresponding to M—2 F); 6.5 area % in the gas chromatogram of the distilled product.

2. $CF_3(CF_2)_3N(CF_2CF_2OCF_2CF_2CF_3)_2$; $m/e$ of the highest mass peak = 884 (corresponding to M—F) and 668 (corresponding to M—$OC_3F_7$). 10.8 area % (GC).

3. $(CF_3)_2N(CF_2)_6N(CF_2CF_2OCF_2CF_2CF_3)_2$; $m/e$ = 1,017 (M—F) and 929 (M—$CF_3$—2 F). 5.5 area %.

4. $(CF_3CF_2)_2N(CF_2)_6N(CF_2CF_2OCF_2CF_2CF_3)_2$; $m/e$ = 1,098 (M—2 F): 5.0 area %.

5. 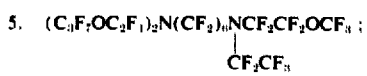

$m/e = 1,183$ (M—F); 1,045 (M—3 F); 4.8 area %

6. 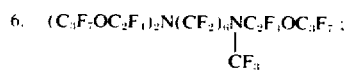

$m/e = 1,233$ (M—F); 1,145 (M—$CF_3$—2 F). 11.3 area %.

7. 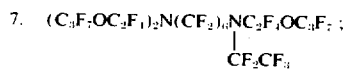

$m/e = 1,283$ (M—F); 9.8 area %

8. 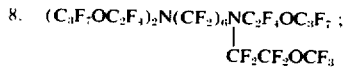

$m/e = 1,430$ (M—2 F); 1,283 (M—$OCF_3$) 12 area %.
9. $(C_3F_7OC_2F_4)_2N(CF_2)_6(C_2F_4OC_3F_7)_2$; $m/e = 1,468$ (M$^+$); 1,449 (M—F); 1,430 (M—2 F); 1,411 (M—3 F): 21.3 area %.

EXAMPLE 4

As described before, starting from a solution of 100 g of hexakis-(2-H-tetrafluoro-ethoxyethyl)-tripropylene tetramine in 1,500 g of HF, 790 g of this substance were fluorinated within 66 hours in a Simons cell. The electrolysis was carried out at a temperature of + 5°C, a voltage from 5.3 to 6.2 volts and an average current density of 1.5 A/dm$^2$; 572 g of perfluorinated crude product, corresponding to 39.1 % of the theoretical yield, relative to the following reaction equation, were obtained:

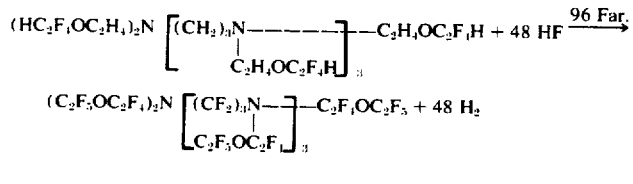

In the distillation of the electrolyte solution, a further 370 g of residue having the following analysis data was obtained: 28.1 % C: 2.1 % H; 57.6 % F; the molecular weight was osmometrically determined to be 1,316.

These data confirm the summation formula $C_{33}H_{29}F_{43}N_4O_6$, which is an already particulaly fluorinated starting substance where an average of 20 further hydrogen atoms are replaced by fluorine. Calculated on the yield of perfluorinated product, this would correspond to a total yield of about 60 % of the theoretical yield.

The crude product was worked up as usual and fractionated under reduced pressure. About 111 g passed over at 144° – 200°C, about 83 g at 200° – 255°C and about 200 g at 136° – 175°C/0.4 mm Hg. The solidification point of the latter fraction was −41°C.

The results of gas chromatography and mass spectrometry were the following:

| substance | $\frac{m}{e}$ of the highest mass peak | area % in the gas chromatogramm |
|---|---|---|
| $CF_3N(C_2F_4OC_2F_5)_2$ | 534 ($\underline{\Delta}$ M-F) | 3.0 |
| $C_2F_5N(C_2F_4OC_2F_5)_2$ | 584 ($\underline{\Delta}$ M-F) | 5.1 |
| $CF_3(CF_2)_2N(C_2F_4OC_2F_5)_2$ | 634 (M-F) | 6.9 |
| $(C_2F_5OC_2F_4)_2N(CF_2)_3NC_2F_4OC_2F_5$ | 983 (M-F) | 5.3 |
| $(C_2F_5OC_2F_4)_2N(CF_2)_3NC_2F_4OC_2F_5$ <br> with $C_2F_5$ branch | 1033 (M-F) | 5.5 |
| $(C_2F_5OC_2F_4)_2N(CF_2)_3N(CF_2)_3N(CF_2)_2CF_3$ with $(CF_2)_2CF_3$, $C_2F_5OCF_2CF_2$, $CF_2CF_2OC_2F_5$ branches | 1451 (M$^+$) | 11.0 |
| $(C_2F_5OC_2F_4)_2N[(CF_2)_3-N(C_2F_5OCF_2CF_2)]_3-C_2F_5$ | 1781 (M$^+$) 1762, 1731 1650, 1332, 1317 basis 119 | 48.5 |
| $(C_2F_5OC_2F_4)_2N[(CF_2)_3-N(C_2F_5OCF_2CF_2)]_3-C_2F_4OCF_3$ | 1869(M$^+$), 1850(M-F) 1750, 1734, 1684 basis 119 | |
| $(C_2F_5OC_2F_4)_2N[(CF_2)_3-N(C_2F_5OCF_2CF_2)]_3-C_2F_4OC_2F_5$ | 1916(M$^+$), 1897(M-F) 1797, 1778, 1662 basis 119 | |

EXAMPLE 5

466 g of N-(2-H-tetrafluoro-ethoxyethyl)-piperidine were fluorinated in the cell as described within 85 hours and at 5°C and from 5.1 to 5.8 volts. 652 g of fluorinated product, corresponding to 64 % of the theoretical yield, relative to the following reaction equation, were obtained.

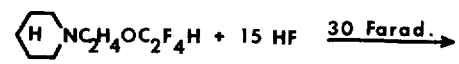

According to a gas chromatography analysis, 84 area % of the product consisted of the compound having the expected structure ($m/e$ of the highest mass peak = 480 $\Delta$M—F), confirmed by NMR spectroscopy. The fluorination product had a boiling point of 125°– 128°C/760 mm Hg (corrected). Also this structure was confirmed by the NMR spectrum.

| Analysis: | | | |
|---|---|---|---|
| found: | 21.8 % C; | 0 % H; | 72.2 % F |
| calculated: | 21.6 % C; | 0.3 % H; | 72.3 % F |

What is claimed is:
1. A compound of the formula

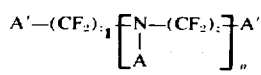

where the radicals A' each are —NA$_2$ or together form the radical

from 0 to 2 radicals A each represent

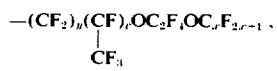

from 0 to 2 radicals A each represent R$_F$.
all other radicals A, but at least one, each represent

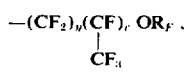

R$_F$ is a linear perfluoro-alkyl radical having from one to three carbon atoms,
$z_1$ is an integer of from 1 to 6,
$z$ represents the same or different integers of from 1 to 6,
$n$ is 0, 1, 2, 3, 4, 5 or 6,
$y$ is 1, 2 or 3,
$v$ is 0 or 1 and
$x$ is 2 or 3.

2. A compound as claimed in claim 1, having the formula

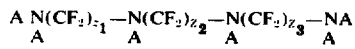

where A represents

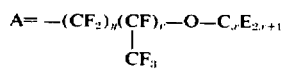

and where $z_1$, $z_2$ and $z_3$ may be the same or different, integers each being greater than 1, but smaller than 7; and
$x$ is 2 or 3 and
$z_1 + z_2 + z_3 \leq 15$ 3. A compound as claimed in claim 2, having the formula

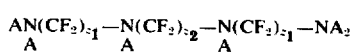

4. A compound as claimed in claim 1, having the formula

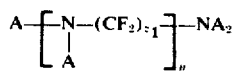

where $n$ is 1, 2, 3 or 4 and A and $z_1$ are as defined in claim 2, and $z_1 n \leq 15$.

5. A compound as claimed in claim 1, having the formula

A$_2$N—(CF$_2$)$_{z_1}$—NA$_2$ where $2 \leq z_1 \leq 6$.

6. A compound as claimed in claim 1, having the formula

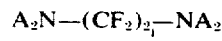

where A is

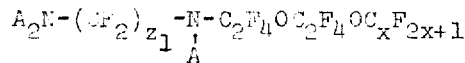

and $z_1$ is an integer greater than 1 but smaller than 7.

7. A compound as claimed in claim 1, having the formula

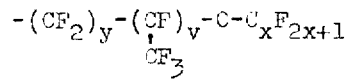

where R$_F$ is linear perfluoro-alkyl having from one to three carbon atoms, A is

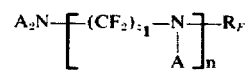

$Z_1$ is an integer greater than 1 but smaller than 7; $n$ is 1, 2, 3, or 4; and $z_1 n \leq 15$.

8. A compound as claimed in claim 1, having the formula

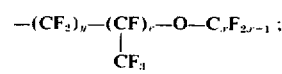

where A is

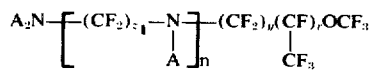

$z_1$ is an integer greater than 1 but smaller than 7; $n$ is 1, 2, 3, or 4; and $z_1 n \leq 15$.

9. A compound as claimed in claim 1, having the formula

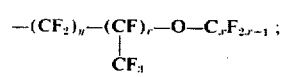

where R$_{F1}$ and R$_{F2}$ are each perfluoro-alkyl having from one to three carbon atoms; A is

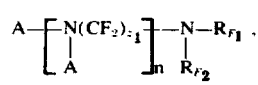

$z_1$ is an integer greater than 1 but smaller than 7; $n$ is 1, 2, 3, or 4; and $z_1 n \leq 15$.

10. A compound as claimed in claim 1, having the formula

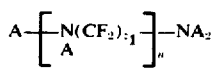

where A is $-C_2F_4OC_2F_5$, $n$ is 1, 2, 3 or 4 and $2 \leq z_1 \leq 6$ and $z_1 n \leq 15$.

11. A compound as claimed in claim 1, having the formula

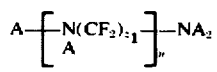

where A is $-C_2F_4OC_3F_7$, $n$ is 1, 2, 3 or 4 and $2 \leq z_1 \leq 6$ and $z_1 n \leq 15$ 12. A compound as claimed in claim 1, having the formula

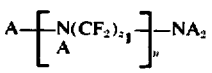

where A is

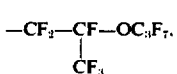

$n$ is 1, 2, 3 or 4 and $2 \leq z_1 \leq 6$ and $z_1 n \leq 15$

13. A compound as claimed in claim 1, having the formula

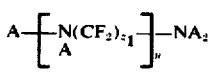

where A is

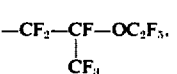

$n$ is 1, 2, 3 or 4 and $2 \leq z_1 \leq 6$ and $z_1 \leq n \leq 15$

14. A compound as claimed in claim 1, having the formula

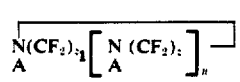

where A represents

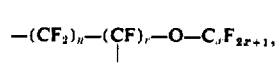

$z_1$ is an integer small than 6
$z$ represents the same or different integers of from 1 to 5
$n$ is 0, 1, 2 or 3
$y$ is 1, 2 or 3
$v$ is 0 or 1
$x$ is 2 or 3 and $3 \leq z_1 + z \cdot n \leq 5$.

15. A compound as claimed in claim 14, having the formula

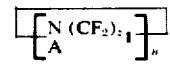

where $n$ is 1, 2, 3 or 4.

16. A compound as claimed in claim 15, having the formula

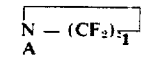

17. A compound as claimed in claim 14, having the formula

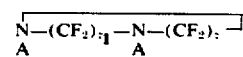

18. A compound as claimed in claim 15, having the formula

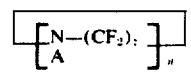

where A is $-C_2F_4-OC_xF_{2x+1}$

19. A compound of the formula

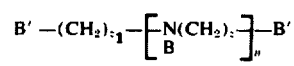

where the radicals B' each are $-NB_2$ or together represent the radical

the radical B is

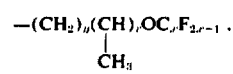

$z_1$ is an integer of from 1 to 6,
$z$ represents the same or different integers of from 1 to 6,
$n$ is 0, 1, 2, 3, 4, 5 or 6,
$y$ is 1, 2 or 3,
$v$ is 0 or 1,
$x$ is 2 or 3.

20. A compound as claimed in claim 19, having the formula

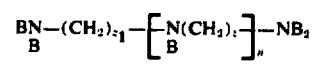

where B is

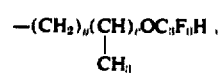

$n$ is 1, 2, 3, 4, 5 or 6,
$z_1$ is an integer of from 2 to 6, $z$ represents the same or different integers of from 2 to 6 and $z_1 + z \cdot n \leq 15$.

21. A compound as claimed in claim 19, having the formula

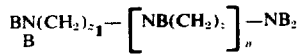

where B is — $C_2H_4OC_2F_4H$ $z_1$ is an integer of from 2 to 6, $z$ represents the same or different integers of from 2 to 6 and $z_1 + z \cdot n \leq 15$.

22. A compound as claimed in claim 19, having the formula

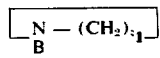

where B is $-(CH_2)_n(CH)_zOC_2F_4H$
$\quad\quad\quad CH_3$ and $2 < z_1 < 6$

23. A compound as claimed in claim 19, having the formula

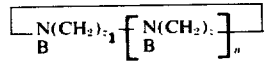

where $z_1$ is an integer of from 1 to 5, $z$ represents the same of different integers of from 1 to 5, $n$ is 0, 1, 2 or 3 and $3 \leq z_1 + z \cdot n \leq 5$.

24. A mixture of highly-fluorinated amino ethers prepared by electrolyzing, in an electrolysis cell having nickel anodes, at a temperature from $-20°C$. to $+30°C$., and at a voltage from 4 to 7.5 volts, an electrically conductive solution of anhydrous liquid hydrogen fluoride and a fluoro-amino ether as in claim 19.

* * * * *